3-24-1874
Re 5,804
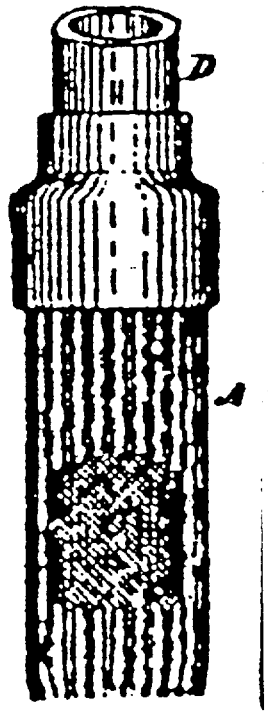

UNITED STATES PATENT OFFICE

JOHN CHRISTMAN, OF SYRACUSE, NEW YORK.

IMPROVEMENT IN PUMP-FILTERS.

Specification forming part of Letters Patent No. 51,145, dated November 28, 1865; reissue No. 5,804, dated March 24, 1874; application filed January 12, 1874.

*To all whom it may concern:*

Be it known that I, JOHN CHRISTMAN, of Syracuse, Onondaga county, New York, have invented an Improvement in Pump-Filters, of which the following is a specification:

In pointed pump-tubes heretofore essayed difficulties have arisen in keeping them free from clogging and rendering them efficient. My invention was made to overcome these difficulties, in which I have fully succeeded.

The construction of my apparatus is substantially as follows, referring to the accompanying drawing, which is a side elevation of the filtering-point made for driving, affixed to the lower end of a pump-tube, with the side-grating A broken to show the wire-gauze C. I form an open grating, A, of rods of proper-sized wire of a convenient length and form, the upper ends of which are permanently affixed to a collar or head piece, B, on which a screw may be cut to affix it to the lower end of the pump-tube D. This screw may be cut on the inside, as shown by the drawing, or on the outside, as preferred, the joint being made in any well-known way. The open grate A extends down cylindrically in the drawing a sufficient distance, and is thence tapered and brought into a solid point, A′, as in the drawing; or it may be made rounded or square, so there is a solid compact end adapted to the purposes intended. Inside the grating A I insert another tube, C, made of wire-gauze, and covering the spaces between the bars of the grate A, and properly fastened in place, which I find makes, in connection with the strong supporting grating, a perfect filter, to be used at the bottom of pump-tubes. Where it is required, as in quicksands, &c., there may be a filtering medium put inside the wire-gauze to resist the outside pressure; but for ordinary cases no such packing is necessary.

Having thus fully described my pump-filter, I claim—

1. The combination of a wire-gauze, C, with an open grating or guard, A, of sufficient strength for the purpose required, and a point, A′, constructed substantially as and for the purposes described.

2. The combination of a grating, A, having apertures through it for the passage of the water to the interior, forming the lower end of a pump-tube, with a wire-gauze, C, for filtering the water, substantially as described.

JOHN CHRISTMAN.

Witnesses:
J. J. GREENOUGH,
P. ELMENDORF SLOAN.